INVENTORS
RALPH E. SCHWARTZ
JOACHIM G. BUSH
LEONARD J. FREITICK
by Toulmin & Toulmin
ATTORNEYS INVENTOR
RALPH E. SCHWARTZ
JOACHIM G. BUSH
LEONARD J. FREITICK
BY Toulmin & Toulmin
ATTORNEYS United States Patent Office 2,766,163

Patented Oct. 9, 1956

2,766,163

PROCESS FOR MANUFACTURING COMPRESSIBLE GLASS FIBER SHOCK ABSORPTION MATERIAL

Ralph E. Schwartz, Hollywood, Joachim G. Bush, Santa Clara, and Leonard J. Freitick, La Crescenta, Calif., assignors to Vibradamp Corporation, Los Angeles, Calif., a corporation of California Application March 13, 1952, Serial No. 276,378

2 Claims. (Cl. 154—100)

This invention relates to a compressible material that retains resilience under the application of pressure of a determined load value for sustaining the load under determined values of resilience and a process of producing such material.

An object of the invention is to utilize a friable material such as glass fibers for supporting pressure loads under conditions of controlled resilience and a process for producing a material capable of such use.

It is another object of the invention to provide a glass fibrous material and the method of producing the same, which material is adapted to resiliently support a pressure load under conditions wherein the degree of compression of the material is related to the load supported by it to give relatively constant conditions of resilient support at predetermined values of compression or deflection of the material.

Still another object of the invention is to provide a glass fibrous material accomplishing the purposes of the foregoing object wherein the load carrying glass fibers are angularly related to the direction of the application of the load on the material with those glass fibers that are incorrectly disposed for cooperative support of the load, or are incapable of cooperative support of the load, are broken or fractured so that interconnecting bridging fibers constitute the load carrying fibers.

It is another object of the invention to provide a process for producing a glass fibrous material for accomplishing the results of the foregoing objects wherein glass fibers are assembled together in a mass sufficient to result in a determined density when the mass is compressed to a predetermined dimension with the assemblage of glass fibers being bonded together while maintained under the controlled degree of compression to establish dimensional stability of the mass of glass fibers, which bonded mass of glass fibers is thereafter compressed or deflected to an extent at least equal to the compression occasioned for support of the maximum load to be imposed on the mass, this cold working of the bonded glass fiber mass resulting in a stabilization of the resilience factors of the material.

The invention further relates to a glass fibrous material for use as a shock absorbing substance and a mount therefor whereby the material is adaptable for use in absorbing vibration and shock acceleration as from a mounting platform for motors, radios and other electronic devices.

In general, the invention comprises a glass fibrous material wherein the glass fibers are individually coated with a suitable binding agent, such as a phenol-formaldehyde resin, the mass of binder coated glass fibers being thereafter pressed under heat and pressure to a controlled determined density to form a material which is adapted to be used as a mounting pad to absorb vibration and shock accelerations. Further, the invention includes the processing of the material so obtained by a compression or cold working of the so bonded material to stabilize the resilience factor of the material.

It is also an object of the invention to provide a shock absorbing material which has substantially no drift or fatigue failure, and its vibration absorption character is maintained over a wide temperature and a wide weight range.

Other objects and advantages will be apparent from the following description and from the drawings.

In the construction of the glass fibrous material of this invention, the glass fibers may be produced in one of several well-known devices by which the glass fibers are collected as a felted assemblage in a mat or pad form. These glass fibers may be long relatively continuous length fibers, or can be short length staple fiber, or a mixture of them. In general, the glass fibers are produced by the application of high pressure streams of a gaseous medium applied to opposite sides of thin streams of molten glass whereby the molten glass is drawn and attenuated into fine glass fibers or filaments of extremely fine diameter, depending upon the exact processing of the glass material. Preferably, the glass fibers used in this invention are those having a diameter of between 0.00005 and 0.00025 inch.

The glass fibers or filaments so formed are collected in a mat or pad of any desired thickness, which mats and pads have utility in various ways well-known in the art.

Depending upon the use intended for the glass fibers thus produced, they can have a binding agent applied to the glass fibers during the course of their production, or the binding agent can be eliminated if desired. The glass fibrous material containing the binding agent is subsequently treated to cause the binding agent to bond the glass fibers together.

In this invention the glass fibrous material that is used in the manufacture of the pressure absorption material of the invention is that which contains a binding agent on the glass fibers. The binding agent is preferably phenol-formaldehyde resin, but other binding agents such as nylon, polyethylene, and the various silicon and vinyl compounds and others can be used depending upon the conditions of use of the vibration absorption material, the temperature under which it operates, and other factors. The binding agent shall be one that is applied to the glass fibers in a state in which it can be activated for obtaining its binding action, or shall be one which can be reactivated to secure such result. Thus, either thermosetting or thermoplastic resins can be used, the thermosetting resins being applied on the fibers in an unpolymerized state, whereas the thermoplastic resins can be subsequently reactivated by heat to secure the desired binding action. Preferably resins of the thermosetting type, such as phenol-formaldehyde resin are used.

Figures 9, 10, 11, 12, 13, 14, 15, 16, 17:
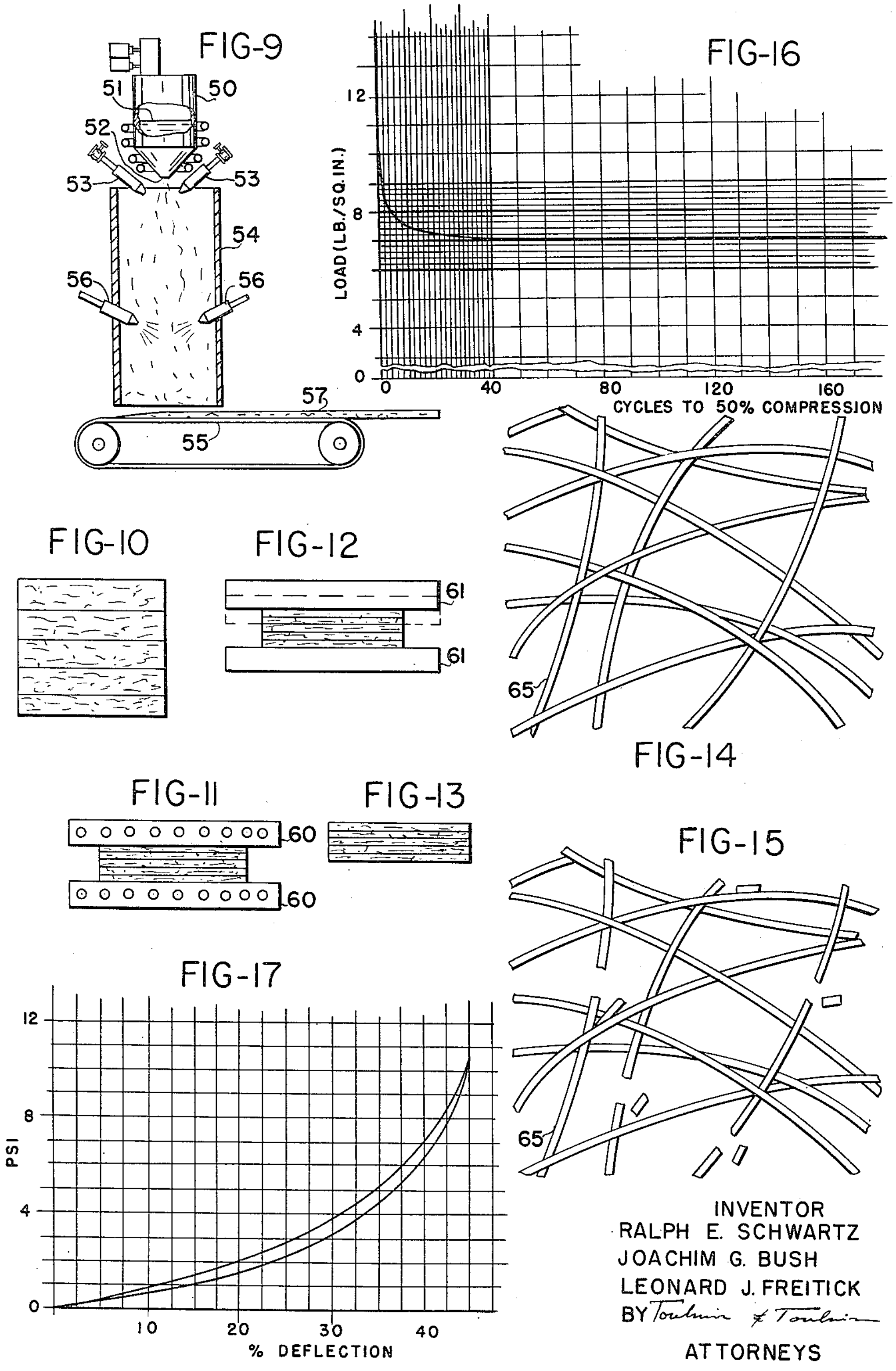
Figure 9 is a diagrammatic cross-sectional view of apparatus for producing fibrous glass with a suitable binder thereon.
Figure 10 is an elevational view of an assemblage of glass fibers of determined weight as ready for subsequent processing.
Figure 11 is a diagrammatic view illustrating the step in the process of producing the fibrous material, of compressing the assemblage of fibers of Figure 10 to a controlled density, and heating the fibers for binding of them together.
Figure 12 represents the step in the process of making the material wherein the bonded assemblage of glass fibers is compressed or deflected to stabilize the resilience value of the material.
Figure 13 is a view of the finished material.
Figure 14 is an enlarged cross-sectional view of the glass fibrous material of this invention as produced in the step of the process of Figure 11.
Figure 15 is an enlarged cross-sectional view of the glass fibrous material of Figure 14 as produced in the step of the process illustrated in Figure 12.
Figure 16 is a chart illustrating the stabilization curve of the glass fibrous material.
Figure 17 is a load deflection curve of the stabilized glass fibrous material.

In producing the glass fibers for use in the production of this invention, apparatus such as that diagrammatically illustrated in Figure 9 can be used. In this apparatus there is a heating and melting chamber 50 that contains a body of molten glass 51 that passes through small openings 52 in the bottom of the chamber 50. At each side of the openings 52 there is provided devices 53 for supplying high-pressure streams of a gaseous medium to opposite sides of the glass streams passing through the openings 52. The streams of gaseous medium draw and attenuate the molten glass streams into fine glass fibers or filaments.

The glass fibers or filaments so produced are collected within a hood 54 and are finally collected on a belt 55. As the glass fibers or filaments fall onto the belt 55, a suitable binding agent is applied to the glass fibers by the spray nozzles 56, thus coating the glass fibers with the desired binding agent.

As the glass fibers or filaments collect upon the belt 55 they felt or intertwine together so that a felted mass or mat 57 of glass fibers is delivered from the hood 54. As the glass fibers or filaments collect on the belt 55 they assume a more or less common direction of arrangement, tending to lay parallel or somewhat angular to one another, but generally in a common direction. However, while the majority of the glass fibers arrange themselves in a common direction, yet numerous fibers are angular to that common direction and some even normal thereto. The effect of these fibers will be discussed hereinafter.

The mat or assemblage of glass fibers produced in the apparatus of Figure 9, and containing preferably a phenol-formaldehyde resin that is unpolymerized or uncured, is cut into desired lengths and the mat is assembled into layers by stacking one section upon another. It will be understood, however, that if desired a mat of desired thickness can be produced rather than producing a thick mat by a laminating process. With the mat 57 being arranged horizontal, it can be generally said that the glass fibers of the mat are positioned horizontally.

The quantity of glass fibers that is brought together into the laminated assemblage of Figure 10 is dependent upon the density of the glass fibrous material that is to be produced. It has been determined that by controlling the density of the glass fibrous material it is capable of resiliently supporting pressures of a very broad range, but that each density of the material will support pressures only within certain ranges resulting in various degrees of compression of the glass fibrous material. For example, a glass fibrous material having a density of 1 pound per cubic foot will support pressures of from 0.1 pound per square inch at 15% deflection to about 1.5 pounds per square inch at 75% deflection. Glass fibrous material having a density of 20 pounds per cubic foot will resiliently support pressures from about 100 pounds per square inch at 15% deflection to about 1600 pounds per square inch at 65% deflection.

Thus, in Figure 10 there is illustrated the step in the process of making the product of this invention of producing an assemblage of glass fibers of sufficient quantity to secure a given density when compressed to a given thickness.

The assemblage of glass fibrous material illustrated in Figure 10 is then placed between pressure plates 60, as illustrated in Figure 11, to compress the assemblage of glass fibers to the desired density, as for example from 1 pound to 20 pounds per square foot. Also, the determined density of the glass fibrous material is established when the material is at a desired thickness or height, dependent upon the dimensions desired in the finished product.

While the glass fibrous material is held to a desired density at a desired dimension between the pressure plates 60, the binding agent on the glass fibers is activated or reactivated to cause a bonding between the glass fibers at their various points of contact. Thus, when the pressure is released from the so-treated glass fibrous material it will retain the dimension at which it was compressed.

The so bonded glass fibrous material is then placed between pressure plates 61 which stress load the bonded glass fibrous material to compress it to an extent not less than that at which it will be compressed when supporting the maximum load to be imposed on the material. A number of such cold working compressions or deflections are given to the material to stabilize the resilience factor of the material. This loading or stressing of the bonded glass fibrous material is occasioned in the same direction as that which will be occasioned upon the material when the supported load is applied.

The effect of the stress loading or cold working of the glass fibrous material is to eliminate the effect of any glass fibers in the material that tend to resist deflection of the material and to fracture those glass fibers that are improperly disposed in the material for cooperative resilient support of the load that is to be imposed on the material.

For example, Figure 14 illustrates the bonded glass fibrous material taken from the step of the process illustrated in Figure 11, while Figure 15 illustrates the same glass fibrous material after stress loading or cold working according to the process step of Figure 12. In Figure 14 all of the various glass fibers are bonded together at their points of contact, and the majority of the fibers lay in a common direction or slightly angular thereto. However, numerous glass fibers are quite angular to the direction of lay of the majority of the fibers and some are even normal thereto. By stress loading the bonded glass fibrous material, those glass fibers that are normal to the lay of the majority of the glass fibers or those extremely angular thereto, are fractured or broken, as illustrated by the glass fibers numbered 65 in Figure 15. The fracturing or breaking of these glass fibers permits the remaining fibers that cooperate to support the load to remain wholly effective at all times, and with those glass fibers that would resist the resilient action of the glass fibrous material fractured or broken, the resilience factor of the material is stabilized.

For example, in Figure 16 there is illustrated a chart showing the result of cold working or compression cycling of the bonded glass fibrous material. The material tested consisted of bonded glass fibrous material of a density of 6 pounds per cubic foot which was compressed to 50% of its initial height and is to carry full load at 40% deflection. Normally cycling or cold working is carried 10% beyond the maximum deflection of the material under maximum load to stabilize the resilience value of the material under full load conditions.

As represented in the chart, it will be seen that the initial compression of the material to 50% of its initial height required a load of about 16 pounds per square inch. After the first two compression cycles the load required to compress the material to 50% of its height reduced to about 8 pounds per square inch. It will thus be seen that the maximum degree of stabilization of the resilience factor is obtained in the initial loadings or compression stressings of the material.

Thereafter, up to the first ten cycles of stress loadings the pressure required for loading changes only a minor amount, the pressure loading be reduced from about 8 pounds per square inch to slightly over 7 pounds per square inch. At this point the glass fibrous material is sufficiently stabilized that it can be said to be stabilized for all practical purposes. However, in the event for the need of extreme accuracy for the stabilization of the resilience factor, the material can be cycled an additional number of times until at about fifty cycles of stress loadings the product becomes fully stabilized for all practical purposes, even of extreme accuracies.

The stabilized product is now capable of producing repeat performance of spring loading with both a compression and extension of the material following substantially the same rate curve as shown by the typical load deflection curve of Figure 17. The amplitude of vibration absorption is regulated by the hysteresis loop shown on the load deflection curve. By varying the density of the material for a given load to be supported, and thereby varying the degree of compression or deflection of the material, various load deflection curves may be obtained with varying curve shapes on the hysteresis loop to secure the desired control over the amount of energy absorbed by the material in its deflection.

The load deflection curve of Figure 17 is that of a stabilized material of 6 pounds per cubic foot density under a maximum of 45% deflection stabilized by cold working or stress loading ten times. The original free height of the material being 0.999 inch, with the new free height after stress loading and stabilization being 0.994 inch.

The assemblage of the glass fibers coated with phenol-formaldehyde resin is a combination of 5% to 25% phenol-formaldehyde and 95% to 75% glass fibers, with the preferred product containing 15% phenol-formaldehyde and 85% glass fibers. The phenol-formaldehyde used as a binder is preferably of from 97% to 40% by weight of phenol, and 3% to 60% by weight of formaldehyde.

In curing the phenol-formaldehyde resin in the step illustrated in Figure 11, the press plates 60 are heated to a preferred temperature of about 300° F., but which can be varied from about 250° F. to 450° F. In the curing or polymerization of the phenol-formaldehyde resin there is a loss of about 8% by weight of the phenol product.

The glass fibrous material of this invention can be pressure loaded until the load plus the amplitude of vibration compresses the material within 400% of its block compression point. A normal safety factor of 500% is incorporated in the design of the product; the material, if designed to carry 5 pounds, will safely carry 25 pounds.

In Figures 1 to 8 of the drawings there is illustrated structures incorporating the glass fibrous material of this invention and illustrating uses of the material. The glass fibrous material will be hereinafter referred to as "compressed glass fibers" in reference to the devices disclosed in Figures 1 to 8.

Figure 1:
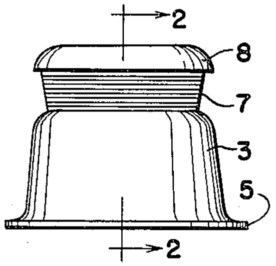
Figure 1 is an elevation showing one form of our invention.
Figure 2:
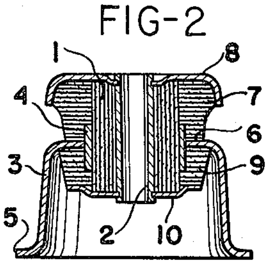
Figure 2 is a section taken on the line 2—2 of Figure 1.

In Figure 1 a core 1 of compressed glass fibers surrounds a tube 2 and is held in position by a mounting base 3, which has a wrapper 4 surrounding the core 1. The base 3 has feet 5 for attaching to a dead base and has a shoulder 6 attached to the wrapper 4. Above the shoulder 6 is placed a core 7 of compressed glass fibers, which is in contact with the core 1 above the wrapper 4. Upon the tops of the cores 1 and 7 is placed a load-bearing plate 8. Below the shoulder 6 a core 9 of compressed glass fibers is placed which contacts the core 1 below the wrapper 4. A retaining plate 10 is attached to the tube 2 and bears against the bottom surfaces of the cores 1 and 9.

The load-bearing plate 8 is similarly attached to the tube 2.

When a load is placed on the load-bearing plate 8 it will tend to compress the cores 1, 7 and 9 downwardly with relation to the shoulder 6 and slide the same down in relation to the wrapper 4. It will be noted therefore that the load is supported by the cores 1 and 7. The core 9 will tend to stop any vibration tending to lift the load while the core 1 will prevent sidewise vibration. The tube 2 forms a passage for the bolt or other holding element to permanently lock any device placed on the top of my shock absorbing means.

Figure 3:
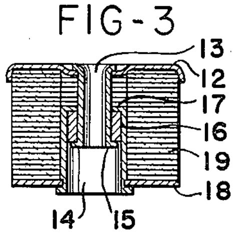
Figure 3 is a sectional view of a modification of our invention.
Figure 4:
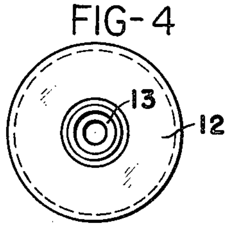
Figure 4 is a top plan view of the modification shown in Figure 3.

In Figures 3 and 4 a modification of our invention is shown. The plate 12 comprises a load-bearing surface and is attached to a tube 13. The tube 13 is adapted to slide in a coaxial tube 14 and has a shoulder 15 which holds in place a rubber grommet 16 between itself and a shoulder 17 on the tube 14. A plate 18 supports a core 19 of compressed glass fibers. A bolt or other fastening means can be passed through the tube 13 to mount thereon the device to be protected and the plate 18 can be attached to the dead load-bearing member.

Figures 5, 6, 7:
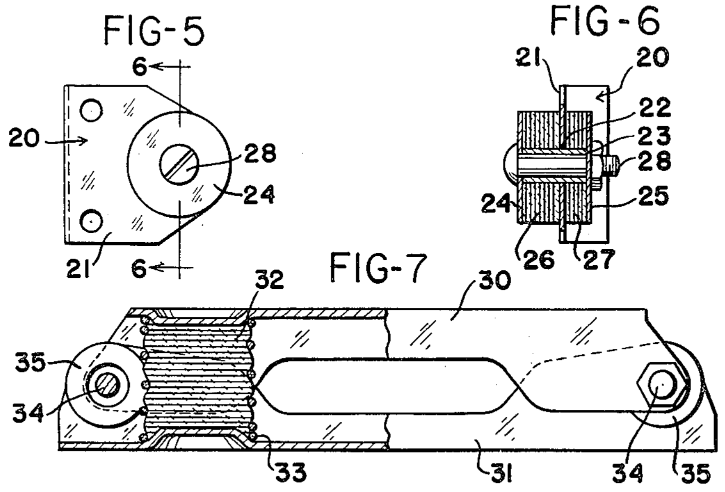
Figure 5 is a top plan view of another modification.
Figure 6 is a section taken on the line 6—6 of Figure 5.
Figure 7 is an elevation partly broken away of another modification of our invention.

In Figures 5 and 6 another modification of a mounting means in accordance with our invention is set forth and comprises a bracket 20 which can be mounted on the dead load-bearing means. The bracket 20 has a shoulder 21 which has a hole 22 therethrough. Through the hole 22 is passed a tube 23, preferably formed of an elastic material such as rubber. At both ends of the tube are plates 24 and 25, between which is placed the cores 26 and 27 of compressed glass fibers, one above and the other below the shoulder 21. A bolt 28 can be used to attach the load to be protected by our shock absorbing member.

Figure 8:
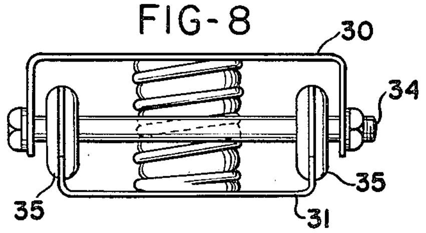
Figure 8 is an end view of the modification shown in Figure 7.

In Figures 7 and 8 a further modification of our invention is shown, which comprises a supporting plate 30 to which is attached the device to be protected from shock. A plate 31 is provided to mount the same upon the dead load-bearing member. Between these two plates is positioned a core 32 formed of the compressed glass fibers and around this core to maintain it in its vertical position is placed a metallic spring 33. To prevent a lateral vibration of the plate 30 in relation to the plate 31 a bolt 34 is passed through the rubber grommet 35 to attach the plate 30 to the plate 31.

This application is a continuation-in-part application of our co-pending application Serial Number 173,968, filed July 15, 1950, now abandoned, for shock absorbing substance and mount therefor.

While there is disclosed and described herein the preferred embodiment of the invention concerning the glass fibrous material and the process of making it, it is understood that alterations can be made in the material and in the process without departing from the spirit of the invention, and that those modifications that fall within the scope of the appended claims are intended to be included herein.

We claim:

1. The process of making a shock-absorbing device having resilient pressure supporting material composed of glass fibers as the shock absorbent comprising providing a mass of molten glass, drawing said glass into streams of fine glass fibers, spraying a heat curable resin on each of said fine fibers, collecting said fibers in a matted layer of first predetermined density, a majority of said glass fibers being disposed in said layer in parallel planes and some of said fibers being arranged substantially vertically to said planes, compressing said matted layer into a mass of second predetermined density, heating the compressed mass while at said second predetermined density to cure the resin and to bind the fibers at their various points of contact, subjecting said cured mass of second density to a uniform predetermined compressive force applied in a direction normal to said parallel planes and of a value greater than the maximum load to be imposed on the pressure supporting material, releasing said uniform force only after the vertically disposed fibers are fractured and a portion of the bonds between the glass fibers are broken to provide a stabilized resilient glass fiber mass having uniform load deflection characteristics under said uniform predetermined compressive force, providing a plurality of spaced plate members which are adapted to receive load stresses, and disposing between said plate members a core composed of said resilient glass fiber mass.

2. The process of making a shock-absorbing device having resilient pressure supporting material composed of glass fibers as the shock absorbent comprising providing a mass of molten glass, drawing said glass into streams of fine glass fibers, spraying a heat curable resin on each of said fine fibers, collecting said fibers in a matted layer of first predetermined density, a majority of said fibers being disposed in said layer in parallel planes and some of said fibers being arranged substantially vertically to said planes, compressing said matted layer into a mass of second predetermined density, heating the compressed mass while at said second predetermined density to cure the resin and to bind the fibers at their various points of contact, subjecting said cured mass to repeated applications of a uniform predetermined compressive force applied in a direction normal to said parallel planes and at a value greater than a maximum load to be imposed on the pressure supporting material, continuing said applications until the substantially vertically disposed fibers are fractured to provide a stabilized resilient glass fiber mass having uniform load deflection characteristics under said uniform predetermined compressive force, providing a plurality of spaced plate members which are adapted to receive load stresses, and disposing between said plate members a core composed of said resilient glass fiber mass.

References Cited in the file of this patent

UNITED STATES PATENTS

| | | |
|---|---|---|
| 1,526,882 | Trimmer | Feb. 17, 1925 |
| 1,998,206 | Rosenzweig | Apr. 16, 1935 |
| 2,115,653 | Snyder | Apr. 26, 1938 |
| 2,211,416 | Goldsmith | Aug. 13, 1940 |
| 2,325,026 | Anway | July 27, 1943 |
| 2,331,146 | Slayter | Oct. 5, 1943 |
| 2,335,102 | Bergin et al. | Nov. 23, 1943 |
| 2,338,839 | Coss | Jan. 11, 1944 |
| 2,349,909 | Meharg | May 30, 1944 |
| 2,375,182 | Anway | May 8, 1945 |
| 2,386,463 | Hile | Oct. 9, 1945 |
| 2,457,058 | Markowitz | Dec. 21, 1948 |
| 2,489,242 | Slayter et al. | Nov. 22, 1949 |
| 2,519,702 | Robinson | Aug. 22, 1950 |
| 2,579,472 | Chamberlin et al. | Dec. 25, 1951 |
| 2,600,843 | Bush | June 17, 1952 |
| 2,611,574 | Davies et al. | Sept. 23, 1952 |